United States Patent [19]

Claytor

[11] Patent Number: 5,184,957
[45] Date of Patent: Feb. 9, 1993

[54] NEEDLEPOINT GRAPH

[76] Inventor: Nancy A. Claytor, 217 E. Liberty St., York, S.C. 29745

[21] Appl. No.: 719,390

[22] Filed: Jun. 24, 1991

[51] Int. Cl.⁵ ............................................. G09B 19/20
[52] U.S. Cl. ......................................... 434/95; 434/96
[58] Field of Search .............................. 434/95, 96, 83

[56] References Cited

U.S. PATENT DOCUMENTS 4,310,313  1/1982  Brundige ............................. 434/95

FOREIGN PATENT DOCUMENTS 10637 of 1912 United Kingdom .................. 434/96

Primary Examiner—Richard J. Apley
Assistant Examiner—Karen Ann Richard
Attorney, Agent, or Firm—Clifton Ted Hunt

[57] ABSTRACT

A needlepoint graph has adjoining rows of ellipses to be marked as a pattern for the designation of traditional continental needlepoint stitches required in a needlepoint canvas to reproduce the pattern on the graph.

4 Claims, 4 Drawing Sheets

NEEDLEPOINT GRAPH

FIELD OF THE INVENTION

This invention relates to a craft item, and more specifically to a needlepoint graph useful in the making of patterns for needlepoint designs to be stitched on a needlepoint canvas with traditional continental needlepoint stitches. As used herein, the word "needlepoint" refers to traditional continental needlepoint.

BACKGROUND OF THE INVENTION

Conventional needlepoint canvas is an open weave of canvas threads or strands with the warp strands extending in spaced parallel relation to each other and the weft or filler strands extending in spaced parallel relation to each other in perpendicular relation to the warp strands. Open squares are defined by the intersecting warp and weft strands.

As is well known to practitioners of the art, every needlepoint stitch is formed by drawing a needle, threaded with a desirably colored.. yarn, across the top of an intersection of warp and weft strands.

The stitch is made by passing a needle and thread upwardly through an open square bordering a selected intersection, then diagonally across the top of the selected intersection, and then downwardly through the adjoining open square.

It is standard practice to provide patterns for designs to be stitched on needlepoint canvas, and it is the purpose of every needlepoint pattern to designate the locations in the canvas required to be stitched to reproduce its design. The prior art patterns were made by selecting and coloring squares on standard square graphs to indicate the required location of stitches in the needlepoint canvas.

It is generally considered that the intersecting lines on the standard square graph,. correspond to the intersecting warp and weft strands in the needlepoint canvas, and that the open squares defined by intersecting lines on the graph correspond to the open squares defined by the intersecting warp and weft strands in the canvas.

The marking of a square surrounded by intersecting graph lines on a conventional needlepoint pattern therefore suggests to the user that the designated stitch goes in the corresponding square in the needlepoint canvas. Persons familiar with needlepoint know, of course, that the needlepoint stitch designated by a marked square in a pattern on a prior art square graph does not just go in the designated square in the canvas, but diagonally across, the top of one of the intersections of warp and weft strands bordering the designated square, as explained above. The user of conventional needlepoint patterns on square graph paper needs to determine which of the four intersections of warp and weft strands bordering a designated square is intended to be stitched.

The prior art practice of designating a needlepoint stitch on canvas by marking a square on standard graph paper is incapable of designating the exact intersection of warp and weft strands to be stitched. This failure of the prior art causes confusion and frustration.

SUMMARY OF THE INVENTION

The needlepoint graph of this invention enables the makers of needlepoint patterns to designate the exact intersection of warp and weft strands to be stitched. It thus avoids the confusion and frustration caused by the prior art patterns on standard graph paper.

More specifically, the needlepoint graph of this invention comprises an area of square or rectangular configuration, and rows of adjoining ellipses extending in a direction parallel with a diagonal of the area. Each ellipse on the graph, corresponds to one intersection of warp and weft strands in the needlepoint canvas, and, collectively, the ellipses simulate traditional continental needlepoint stitches covering the canvas.

A pattern on the elliptical graph designates the exact location of each traditional continental needlepoint stitch required in the canvas by marking the ellipse on the graph corresponding to the exact location of the needlepoint stitch in the canvas.

The user is thus able to correlate a marked ellipse on the pattern with the exact intersection to be stitched on the canvas, and not have to guess which intersection of canvas strands to stitch, as in the prior art.

DETAILED DESCRIPTION OF THE INVENTION

Figures 1, 5:
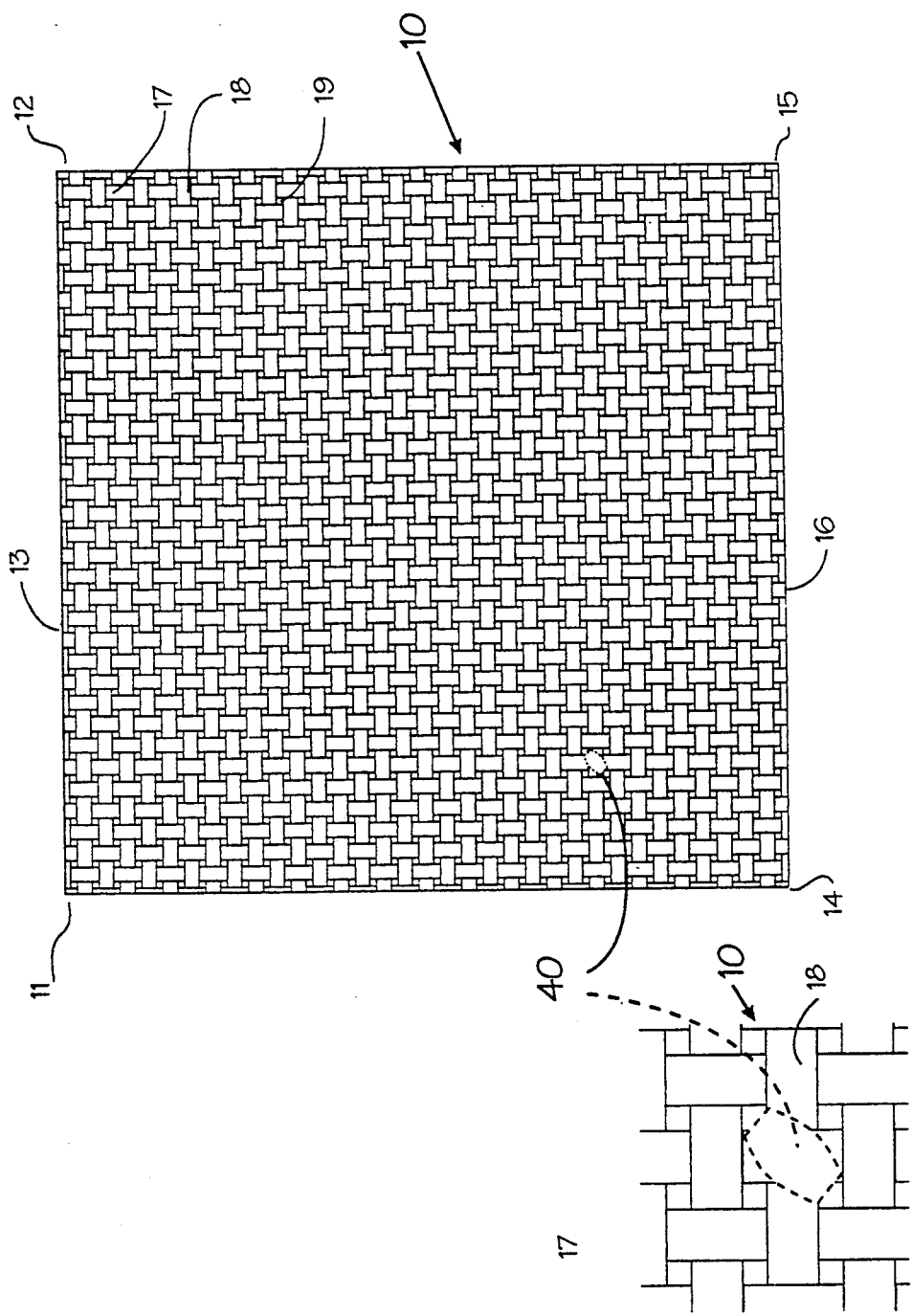
FIG. 1 is a plan view of an empty needlepoint canvas to which needlepoint stitches will be applied according to a selected pattern.
FIG. 5 is an enlarged plan view showing a needlepoint stitch in dotted lines on a portion of the canvas of FIG. 1.

FIG. 1 illustrates a typical needlepoint canvas 10, with which both the prior art square graph and the elliptical graph of this invention are used. The conventional needlepoint canvas 10 typically has upper corners 11 and 12 at its top 13 and lower corners 14 and 15 at its bottom 16. The, canvas 10 is of open weave construction, with spaced warp strands 17 intersecting spaced weft strands 18 to define open squares 19 therebetween. It is with this type of canvas that both the prior art square graph and the elliptical graph of the present invention are used.

Figure 2:
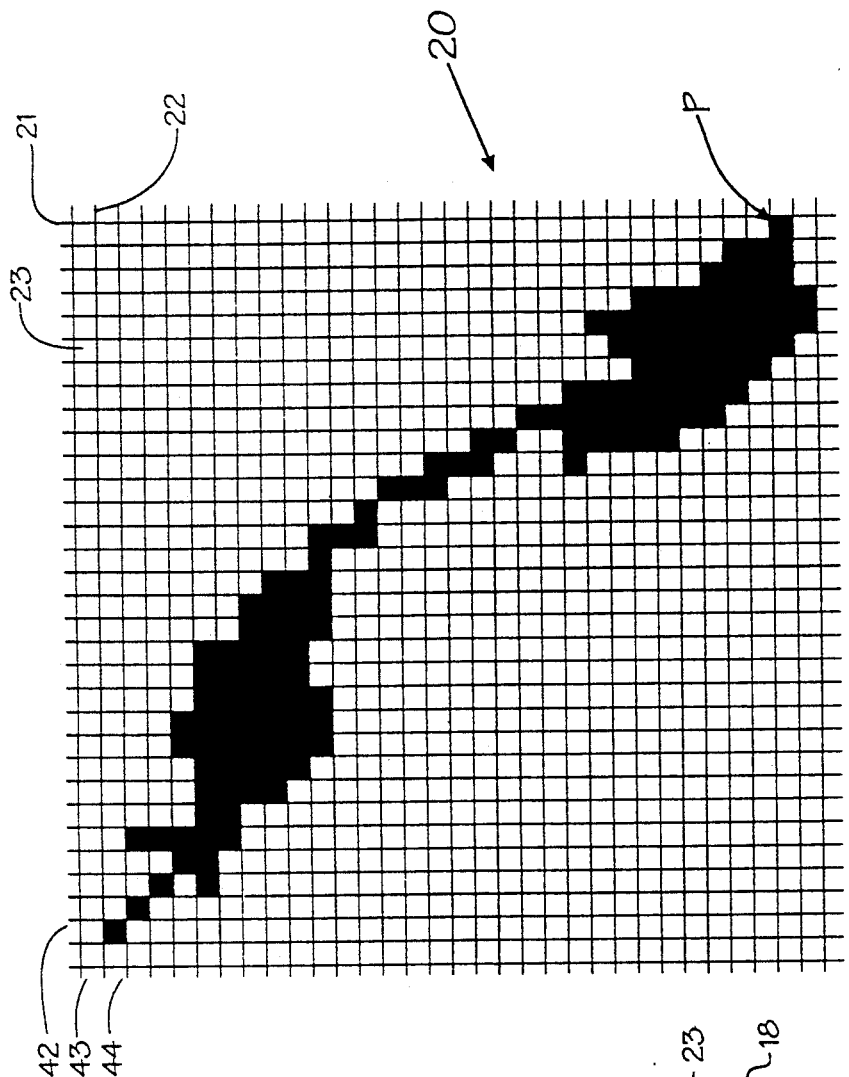
FIG. 2 is a plan view illustrating a needlepoint pattern applied to the prior art square graph.

The square graph of the prior art is broadly indicated at 20 in FIG. 2. It is defined by vertical lines 21 intersecting horizontal lines 22 and defining open squares 23. A selected needlepoint pattern P, in the form of a rose bud and stem, has been applied to the square graph 20.

It is commonly thought that the intersecting lines 21 and 22 on the prior art graph 20 represent the warp and weft strands 17, 18 of the canvas 10.

Figure 3:
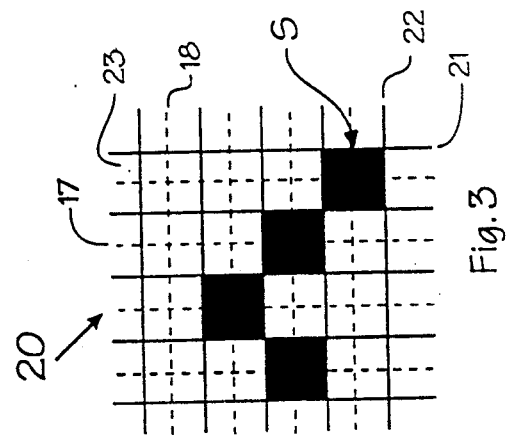
FIG. 3 is a schematic view illustrating the relationship of the prior art square graph shown in FIG. 2 with the needlepoint canvas shown in FIG. 1.

Actually the warp and weft canvas strands indicated by dotted lines 17 and 18 in FIG. 3, are best represented by the squares 23 between the intersecting graph lines 21 and 22 in the square graph, 20, because it is across the intersections of warp and weft strands 17, 18 that stitches S are made. The needleworker must mentally make this adjustment when working with a pattern on the prior art square graph 20.

Figure 4:
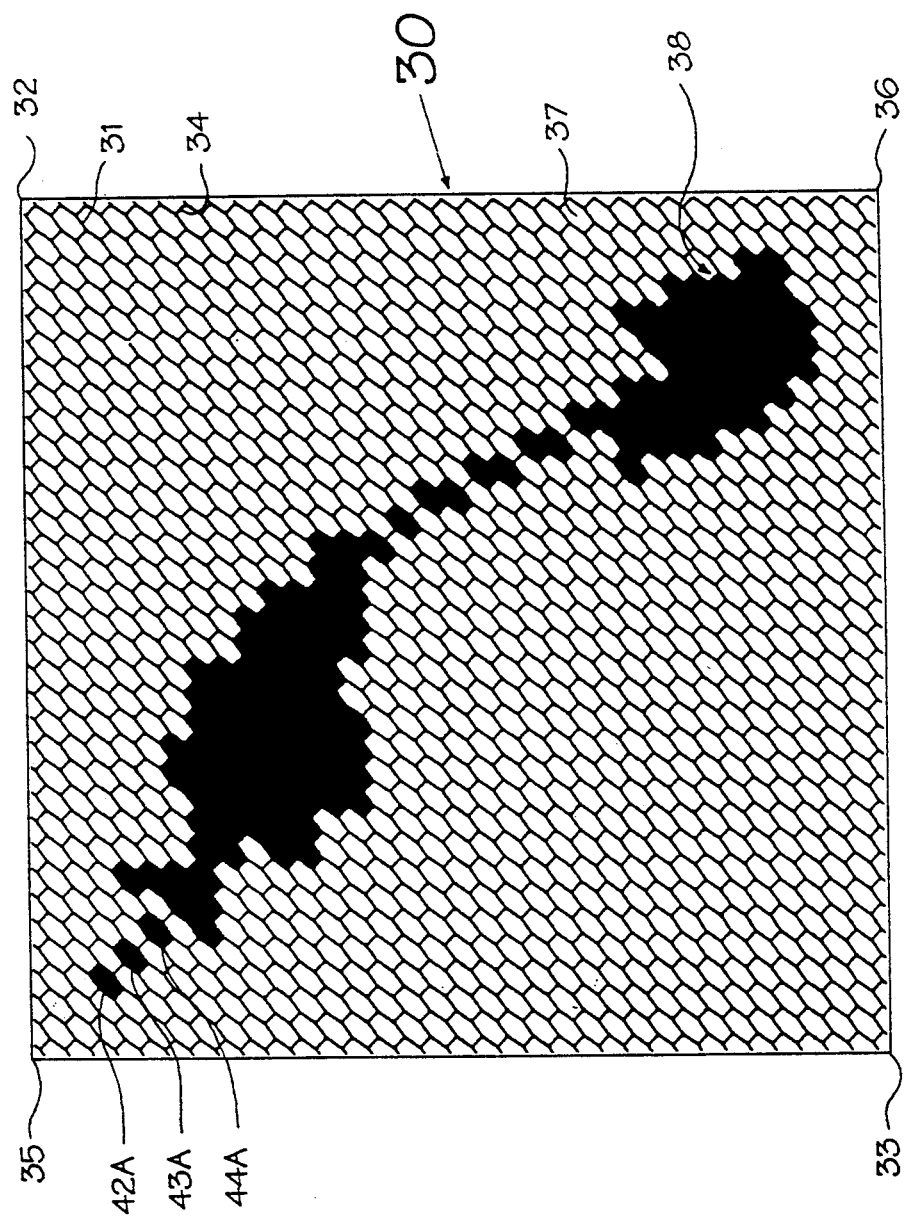
FIG. 4 is a plan view of the elliptical needlepoint graph of this invention with the same needlepoint pattern applied to it as shown in FIG. 2.

FIG. 4 illustrates an elliptical graph 30 defined by a plurality of lines 31 extending in a direction parallel to the diagonal of the graph 30 between diagonally opposed corners 32 and 33, and a plurality of lines 34 extending in a direction parallel to the diagonal of the graph 30 between diagonally opposed corners 35 and 36. Each of the lines 31 is continuous but is not straight. Each of the lines 34 is straight but is not continuous. Together, they define a plurality of ellipses 37 arranged in adjoining rows extending in parallel relation to the diagonal between diagonally opposed corners 32 and 33.

The same needlepoint pattern of a rose bud and stem, as shown at P in FIG. 2, has been applied to the elliptical graph 30 but is designated at 38 for descriptive purposes. The pattern P is defined on the prior art graph 20 by appropriately coloring a square 23 on the graph 20 for each stitch to be made in the needlepoint canvas 10. Similarly, the pattern 38 is defined by appropriately coloring an ellipse 37 on the graph 30 for each stitch to be made in the needlepoint canvas 10.

Figure 6:
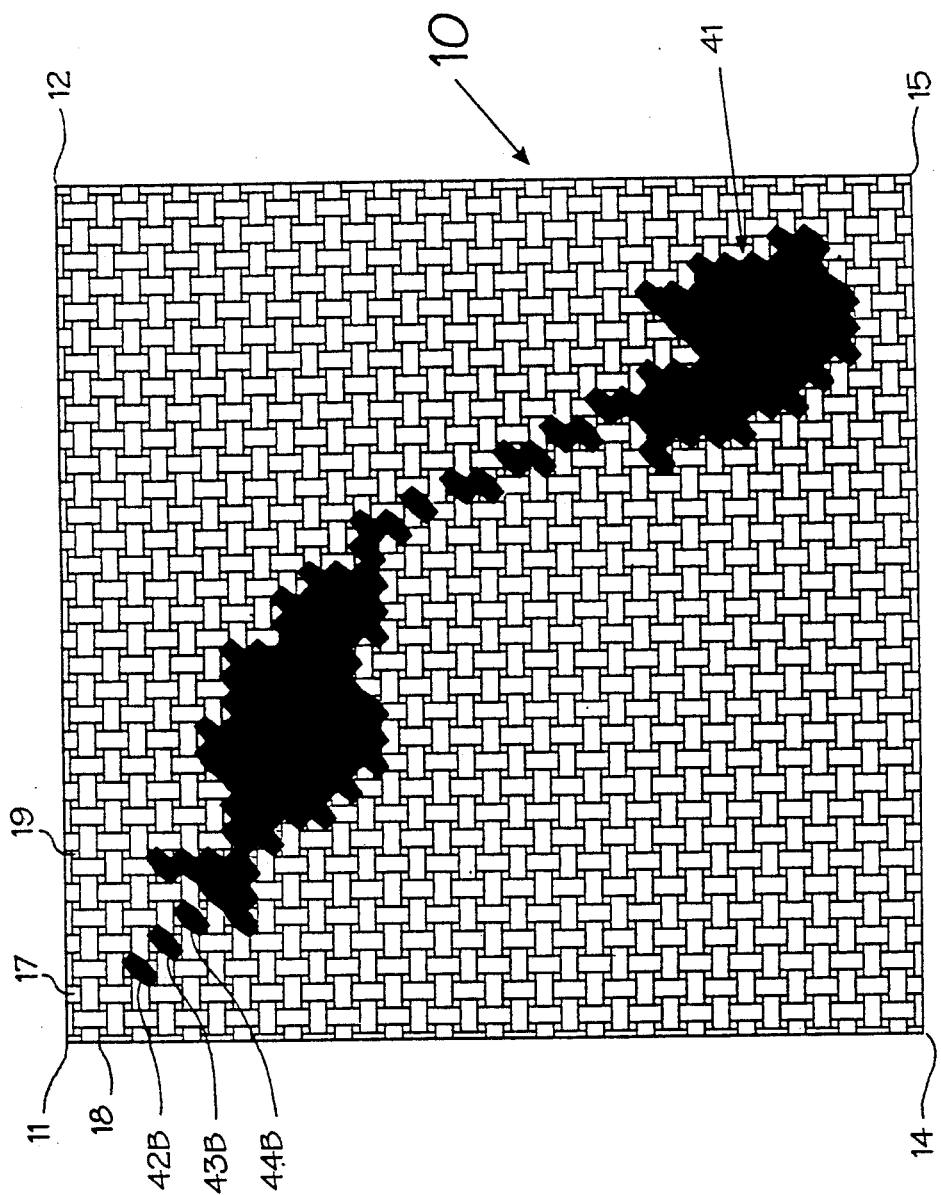
FIG. 6 is a plan view of the needlepoint canvas shown in FIG. 1 after having been stitched according to the pattern shown in FIGS. 2 and 4.

Although the squares 23 in the prior art square graph 20 correspond to the shape of the openings 19 in the needlepoint canvas 10, the filling in of squares 23 to define a pattern on the square graph 20 is not an accurate indication of stitch placement on the canvas 10. It is not accurate because stitches do not go across the squares 19 in the canvas 10 but across intersections of the vertical and horizontal canvas threads 17 and 18, as indicated at 40 in FIG. 5. Patterns on the prior art square graphs 20 often lead to confusion as to which intersection of canvas threads 17, 18 bordering a designated square 19 in the canvas 10 is indicated by a filled in square 23 on the prior art pattern P. The reason for the confusion is evident from a comparison of the stitch indicated at 42 in the pattern P of FIG. 2 with the representation of the actual stitch 42B in the stitched needlepoint canvas 10 of FIG. 6. FIG. 2 represents the stitch 42 as being in a square 23 between lines 21 and 22 on the graph 20. As shown in FIG. 6, the actual stitch 42B extends across the intersection of vertical and horizontal canvas threads 17 and 18.

Conversely, a comparison of the stitches indicated by the pattern 38 in FIG. 4 with the representation of actual stitches in the design 41 on the stitched canvas 10 of FIG. 6 demonstrates the identity of the actual needlepoint stitches 42B, 43B, and 44B with the designation of stitches 42A, 43A, and 44A on the elliptical graph 30.

More specifically, the elliptical graph enables the designation of stitches in the pattern to correspond exactly to the actual location of needlepoint stitches in the canvas 10. The user is thereby relieved of the confusion and frustation caused by the marking of squares to designate stitches on the prior art square graph.

There is thus provided an improved graph for making a pattern of traditional continental needlepoint stitches on needlepoint canvas.

I claim:

1. A needlepoint kit to be used for stitching a needlepoint design on a needlepoint canvas, said kit including a needlepoint graph for making a pattern of the design to be stitched on the needlepoint canvas with traditional continental needlepoint stitches extending diagonally on the needlepoint canvas, said needlepoint graph comprising adjoining rows of ellipses extending diagonally at least throughout the portion of the graph to contain the pattern, whereby a pattern of design may be made by marking selected ellipses and whereby the marked ellipses simulate the location and appearance of needlepoint stitches to be made on the canvas.

2. A needlepoint graph according to claim 1 wherein the rows of ellipses are formed by a first group of lines extending in parallel relation to one diagonal of the graph and a second group of lines extending perpendicularly to the first group of lines, the lines in the first group being continuous and the lines in the second group being discontinuous.

3. A needlepoint kit to be used for stitching a needlepoint design on a needlepoint canvas, said kit including a needlepoint graph for making a pattern of the design to be stitched with traditional continental needlepoint stitches on the needlepoint canvas, the needlepoint canvas having a group of warp strands extending in one direction in spaced parallel relation to each other and a group of weft strands extending perpendicularly to the warp strands and in spaced parallel relation to each other, the weft intersecting the warp strands and defining open squares adjoining each intersection of the warp and weft strands, sad needlepoint graph comprising adjoining rows of elliptically shaped areas extending at least throughout the pattern on the graph in a direction parallel to a diagonal of the graph, and each elliptical area on the graph corresponding to an intersection of the warp and weft strands in the canvas, whereby selected areas on the graph may be marked to designate the strand intersections in the canvas required to be stitched to make a design in the canvas corresponding to the pattern on the graph.

4. A method of making a pattern of a design to be stitched with traditional continental needlepoint stitches on a needlepoint canvas, the needlepoint canvas having a group of warp strands extending in one direction in spaced parallel relation to each other and a group of weft strands extending perpendicularly to the warp strands and in spaced parallel relation to each other, the weft strands intersecting the warp strands and defining open squares adjoining each intersection of the warp and weft strands, said method comprising the steps of:
   (a) providing a graph comprising first and second groups of lines defining diagonally extending rows of ellipses,
      (i) the ellipses corresponding in number and location to the intersections of warp and weft strands substantially throughout that portion of the canvas on which the design is to be stitched; and
   (b) marking selected ellipses in the graph to designate the location of stitches required to form the design of the pattern;
   whereby a user is enabled to locate the intersections of strands in the canvas required to be stitched to make a design on the canvas corresponding to the pattern on the graph.

* * * * *